May 26, 1970 N. J. ANDERSON 3,513,955

LIMIT SWITCH ACTUATING CYLINDER

Filed June 3, 1968 2 Sheets-Sheet 1

INVENTOR.
NORMAN J. ANDERSON
BY
Charles L. Lovenbach
attorney

May 26, 1970   N. J. ANDERSON   3,513,955
LIMIT SWITCH ACTUATING CYLINDER
Filed June 3, 1968   2 Sheets-Sheet 2

INVENTOR.
NORMAN J. ANDERSON
BY
Charles L. Lovenbach
attorney

United States Patent Office 3,513,955
Patented May 26, 1970

3,513,955
LIMIT SWITCH ACTUATING CYLINDER
Norman J. Anderson, Erie, Pa., assignor to Zurn Industries, Inc., Erie, Pa., a corporation of Pennsylvania
Filed June 3, 1968, Ser. No. 733,957
Int. Cl. F16d 25/08
U.S. Cl. 192—86                    6 Claims

ABSTRACT OF THE DISCLOSURE

A shiftable gear coupling with a shifting mechanism to move the coupling from engaged to disengaged position. A mechanism is provided to move the shifting mechanism out of contact with a rotating part of the coupling during operation.

---

This invention relates to couplings and, more particularly, to gear couplings.

Some gear couplings utilize a shifting mechanism with a roller received in a peripheral groove to shift the sleeve teeth from engaged position with hub teeth to a disengaged position. The roller may be moved by a suitable power source such as a conventional hydraulic cylinder. When such conventional means are used to move the sleeve and the sleeve driven at high speed, the roller that engages the sides of the slot in the sleeve is subjected to motion relative to the sides of the slot equal to the peripheral speed of the sleeve. No ball bearings will stand high peripheral speeds of the magnitude that may develop in high speed couplings. It is then usually necessary to provide a continuous lube bearing. To overcome this problem, the invention herein provides a device on the hydraulic shifting cylinder to move the piston and thence the shifting roll out of contact with the walls defining the slot so that no friction results.

It is, accordingly, an object of the invention to provide an improved combination gear shifting mechanism and slidable coupling.

Another object of the invention is to provide a shifting mechanism for a coupling which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
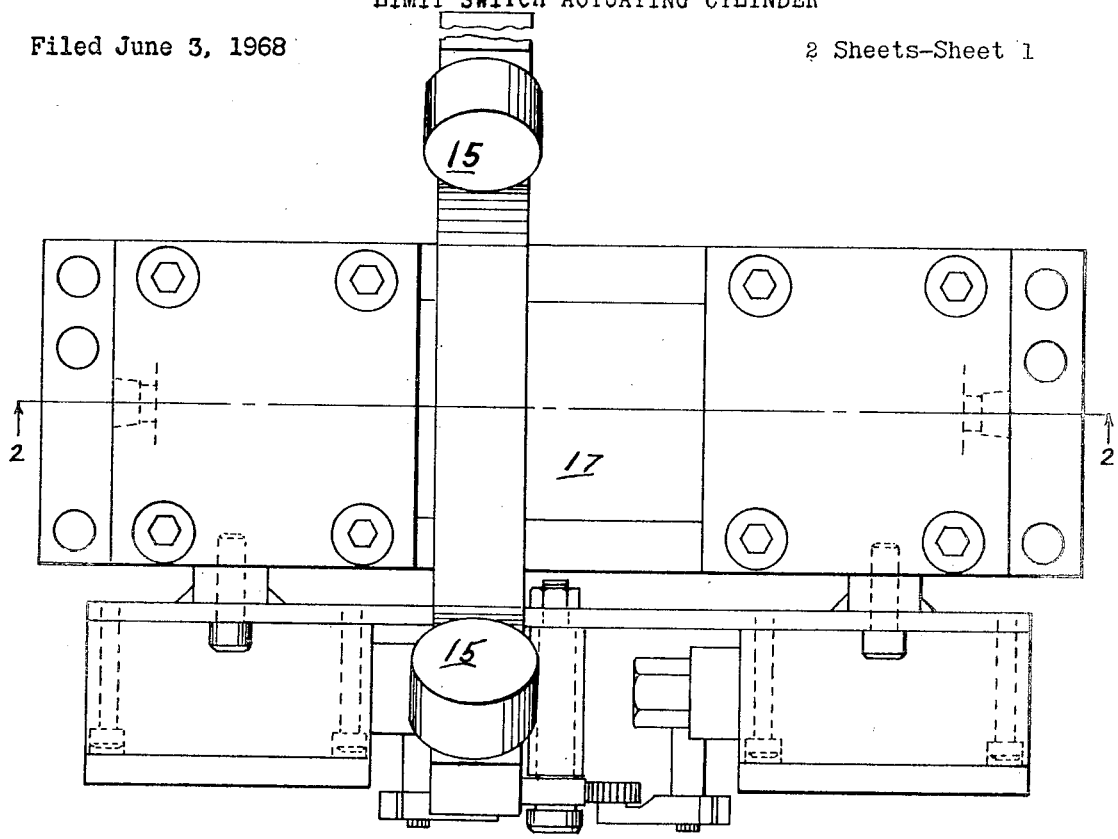
FIG. 1 is a bottom view of the shifting mechanism according to the invention.
Figure 2:
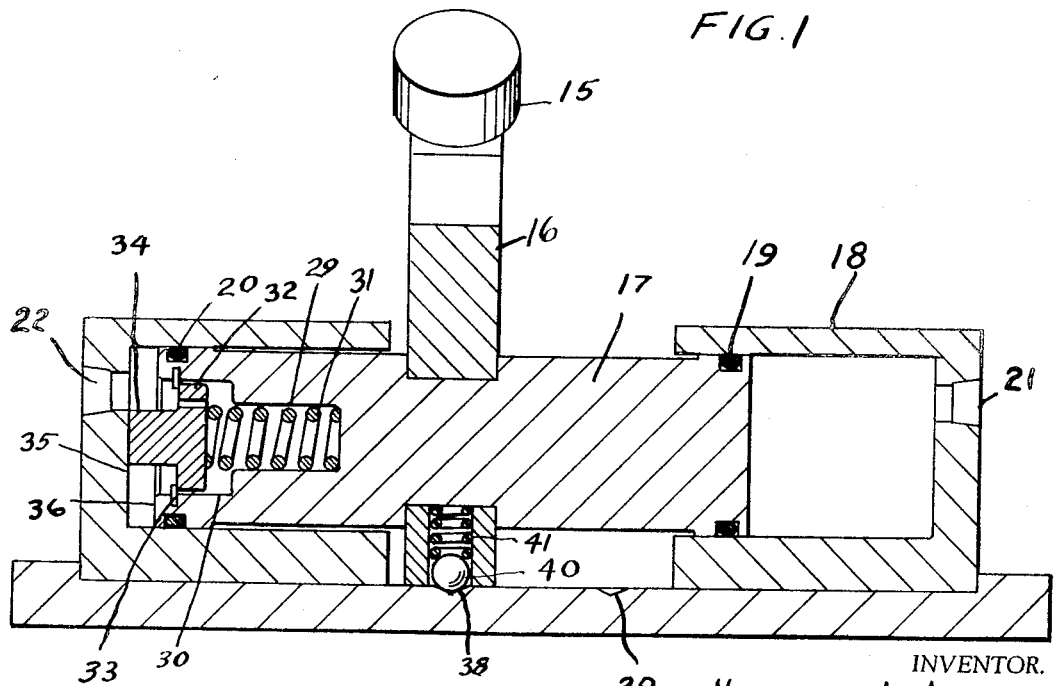
FIG. 2 is a cross sectional view taken on line 2—2 of FIG. 1.
Figure 3:
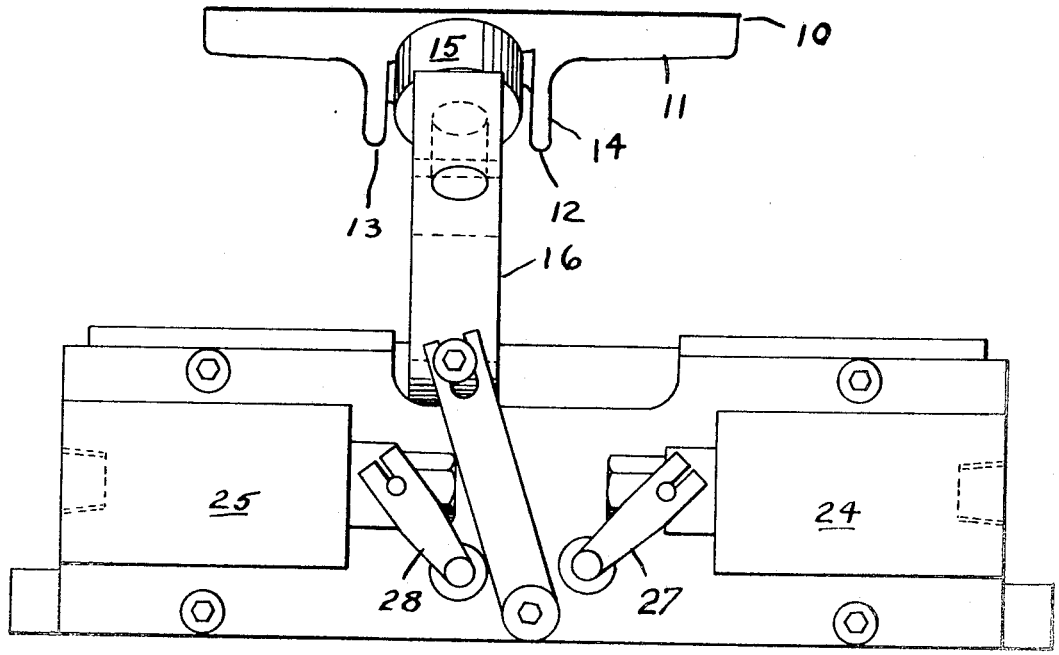
FIG. 3 is a side view of the shifting mechanism.
Figure 4:
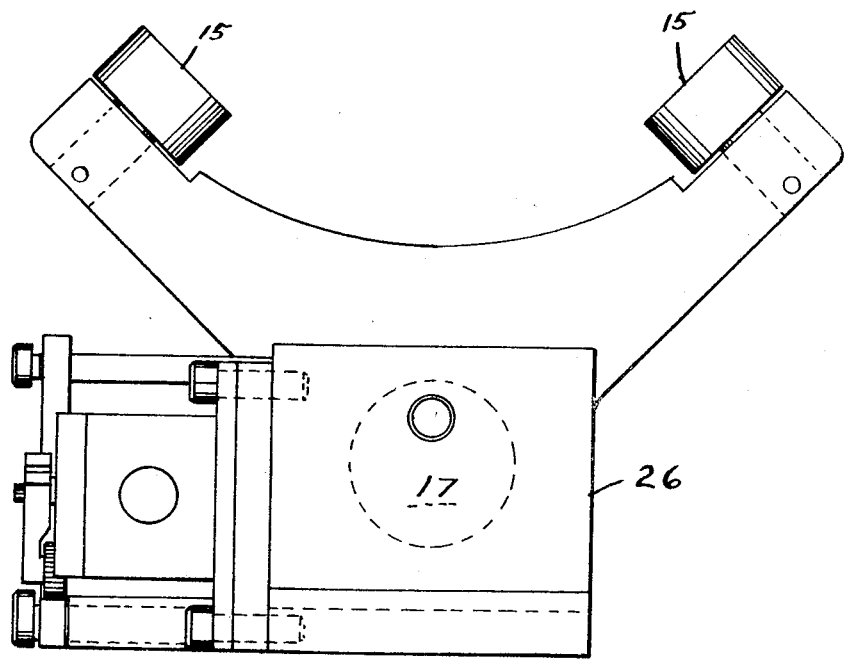
FIG. 4 is an end view of the shifting mechanism.

Now with more particular reference to the drawings, the coupling has a sleeve indicated at 11 that has a peripheral groove 14 defined by the cylindrical flanges 12 and 13. The roll 15 is received in the groove 14 and attached to a shifting fork 16. The shifting fork 16 is fixed to the piston 17, which is received in the cylinder 18. The piston has piston rings 19 and 20. Ports 21 and 22 communicate with the inside of the cylinder and suitable hydraulic lines can be connected to these ports to move the piston 17 to the right or left, that is, to the engaged or disengaged position.

The cylinder 18 is mounted on a suitable framework 26 and suitable limit switches 24 and 25 may be actuated by the levers 27 and 28 in a conventional manner when the piston moves to either of its extreme positions.

The piston 17 has a bore 29 in one end and is counterbored at 30 and a spring 31 is received in the bore 29 and the plunger member 32 is received in the counterbore 30 and restrained therein by a snap ring 33. The end 34 of the plunger member 32 extends beyond the outer end of the piston and it will be noted that it will engage the head 35 of the cylinder 18 before the end 36 of the piston engages the head. Thus, as the piston moves into engagement with the head 35, the member 34 is forced into the counterbore 30 and the spring 31 is compressed. Then as the force on the shifting fork is released, the spring 31 will force the piston back slightly.

A space between the flanges 12 and 13 is slightly greater than the diameter of the roller 15. This provides a clearance between the roller and the flanges. This difference may be approximately ⅛ of an inch or more. Thus, when the piston shifts the gear coupling to coupled position, the spring may push the piston back an amount equal to approximately half of this clearance between the roller 15 and flanges 12 and 13 so that in the rest position, the roller is approximately in the center of the groove 14.

Notches 38 and 39 are provided on the framework 26. These notches receive the ball 40 in the coupled position and in the uncoupled position of the coupling. The spring 41 urges the ball into engagement with the notches 38 and 39. Thus, when the coupling is in the engaged position, the ball 40 will be in the notch 38 and when in the disconnected position, it will be in the notch 39. In operation, pressure is applied in the cylinder 18 on the piston 17 at the right end until it shifts the coupling and bottoms on the cylinder head 35 compressing the spring 31. Pressure is then relieved from the cylinder 18 and the spring pushes the piston back until the plunger 32 rests on the snap ring 33. In this position, the piston has removed the ball 40 back to the notch 38 and in this position the piston holds the roller 15 in approximately the center of the groove 14 where it will not engage flanges 12 and 13.

The foregoing specification sets forth the invention in its preferred practical forms but the structure shown is capable of modification within a range of equivalents without departing from the invention.

The embodiments of the invention in which an exclusive property or privilege is claimed are defined as follows:

1. In combination, a coupling and a shifting mechanism,
   said coupling having coupling means to move from a coupled position to an uncoupled position,
   said coupling means having an outer peripheral groove defined by a first side and a second side,
   said shifting mechanism having an engaging member received in said groove,
   said shifting mechanism having means to move said engaging member to engage said first side to move said coupling means to coupled position,
   and to engage said second side to move said engaging means to uncoupled position,
   and means within said shifting mechanism to move said engaging member out of engagement with said first side after said coupling means is shifted to coupled position whereby said engaging means is out of contact with said first side and said second side during normal operation of said coupling.

2. The combination recited in claim 1 wherein said groove is substantially wider than said engaging member, said means to move said engaging member is adapted to move said engaging member toward uncoupled position an amount substantially equal to half the difference between the width of said slot and the width of said engaging member.

3. The combination recited in claim 2 wherein said engaging member is a roller.

4. The combination recited in claim 3 wherein said means to move said engaging member comprises a hydraulic cylinder having a piston therein,
and said means to move said engaging means comprises a spring in said cylinder engaging said piston near the end of its movement toward coupled position whereby said piston is moved toward uncoupled position said amount by said spring.

5. The combination recited in claim 4 wherein said spring is disposed in a bore in said piston,
and means engaging said spring extends from said piston and engages said cylinder when said piston approaches an end of said cylinder.

6. The combination recited in claim 4 wherein said cylinder has a first and a second axially spaced notch therein,
and said piston has a spring urged detent engaging one said notch when said coupling means is in engaged position,
and said detent engages said second notch when said engaging member is shifted to uncoupled position whereby said piston is held in one of said positions.

References Cited

UNITED STATES PATENTS

| 2,624,437 | 1/1953 | Gardner | 192—98 |
| 2,356,598 | 8/1944 | Lang et al. | 192—86 X |
| 2,822,072 | 2/1958 | Goss | 192—86 |

MILTON KAUFMAN, Primary Examiner

U.S. Cl. X.R.

192—98